(12) United States Patent
Pirkl

(10) Patent No.: US 7,326,914 B2
(45) Date of Patent: Feb. 5, 2008

(54) LIGHT GRID FOR MEASURING AN OBJECT

(75) Inventor: Klaus Pirkl, Buettelborn (DE)

(73) Assignee: Sick AG, Waldkirch (DE)

( * ) Notice: Subject to any disclaimer, the term of this patent is extended or adjusted under 35 U.S.C. 154(b) by 63 days.

(21) Appl. No.: 11/455,043

(22) Filed: Jun. 15, 2006

(65) Prior Publication Data

US 2006/0278817 A1 Dec. 14, 2006

(30) Foreign Application Priority Data

Jun. 16, 2005 (DE) .................. 20 2005 009 517 U

(51) Int. Cl.
*G08B 13/18* (2006.01)
(52) U.S. Cl. .................. 250/221; 340/555; 340/556
(58) Field of Classification Search ................ 250/221; 340/555–557
See application file for complete search history.

(56) References Cited

U.S. PATENT DOCUMENTS

| 3,742,222 | A | * | 6/1973 | Endl ........................... 340/556 |
| 4,520,262 | A | * | 5/1985 | Denton ....................... 250/221 |
| 5,130,532 | A | * | 7/1992 | Clemens ..................... 250/221 |
| 5,506,567 | A | * | 4/1996 | Bichlmaier et al. ......... 340/555 |
| 6,239,423 | B1 | * | 5/2001 | Hama et al. ................. 250/221 |
| 2005/0133702 | A1 | * | 6/2005 | Meyer ........................ 250/221 |

FOREIGN PATENT DOCUMENTS

| DE | 14 41 426 A | 2/1969 |
| DE | 40 04 529 A1 | 8/1991 |
| DE | 195 20 242 C2 | 12/1996 |
| DE | 102 29 408 A1 | 1/2004 |
| DE | 103 08 285 A1 | 9/2004 |
| DE | 103 35 263 A1 | 3/2005 |
| DE | 202005009517 U1 | 8/2005 |
| EP | 0964273 A2 A3 | 12/1999 |

* cited by examiner

*Primary Examiner*—Georgia Epps
*Assistant Examiner*—Stephen Yam
(74) *Attorney, Agent, or Firm*—Townsend and Townsend and Crew, LLP

(57) ABSTRACT

A light grid for measuring an object and securing a dangerous zone of a machine has an emitting unit with individual light emitters for directing a plurality of light beams in the form of emitted light cones approximately along a lit plane. A receiving unit is spaced apart from the emitting unit and has individual light receivers for receiving light from the emitted light cones. The emitting unit and the receiving unit define a protected zone between them. The emitting unit and/or the receiving unit has at least two differently formed first and second optics. The first optics generate the emitted and/or the received first light cones. The first light cones have a greater dimension in a direction parallel to the plane than in a direction transverse to the lit plane. The second optics generate a second emitted and/or received light cone. The second light cones have an approximately circular cross-section, and the first and second optics are alternatingly arranged with a spacing between them so that optical axes of the emitting and receiving units lie approximately in the lit plane.

17 Claims, 2 Drawing Sheets

LIGHT GRID FOR MEASURING AN OBJECT

RELATED APPLICATIONS

This application claims the priority of German utility patent application DE 202005009517 filed Jun. 16, 2005, the disclosure of which is incorporated herein by reference.

BACKGROUND OF THE INVENTION

The present invention concerns light grids for measuring objects and securing dangerous zones around machines.

German patent document DE 694 07 784 T2 discloses a system for determining and judging the type and position of an object which passes one or more rays and interrupts them. The system includes means for generating a matrix of rays. The rays cross each other to form a network-like array of rays. In addition, this system generates information concerning one or more rays that were interrupted by an object and an analyzer which receives this information and from it determines the general type and position of the object that interrupted the rays. The analyzer constructs a space from the information which is bordered by uninterrupted rays inside of which the intruding object lies so that its shape and size can be determined with an acceptable approximation.

This system for detecting and judging the type and position of an object has significant drawbacks. The system uses narrow, focused rays for sensing. Such narrow, focused rays are disadvantageous because they require precise alignments. For the rays to reach the receiver, a precise alignment is a necessity. If the receiver or the light emitter of the system becomes misaligned, the system becomes unusable until it has been realigned.

Further, the light emitter and receiver are alternatingly arranged next to each other. This requires costly controls for operating the emitters and receivers. For example, the results from the individual receivers must be transmitted to an analyzer for further use. Addressing the individual emitters is also costly, because they are arranged on different support bars.

SUMMARY OF THE INVENTION

It is therefore an object of the present invention to provide an improved light grid for measuring objects and securing dangerous zones at or in the vicinity of machines.

This is attained in accordance with the present invention with a light grid for measuring objects and securing a danger zone of a machine. The light grid has a light emitting unit with a plurality of individual light emitters that emit individual light beams in a lit plane and form emitted light cones having diverging boundaries. The light grid further includes a receiving unit that is spaced apart from the emitting unit and has a number of individual light receivers that receive the light from the receiving light cones so that a protected zone is defined between the light emitting unit and the light receiving unit. The emitting unit and/or the receiving unit are provided with at least two different optical arrangements ("optics") for forming the emitted and received light cones. A first optics generates a first emitted light cone and/or a first received light cone. The dimension of these light cones in a direction parallel to the plane is greater than in a direction transverse thereto. A second optics generates a second emitted light cone and a second received light cone which have an approximately circular cross-section. The two optics are alternatingly arranged in the emitting unit and the receiving unit, their optical axes are spaced apart from each other, and they lie approximately in the lit plane.

By expanding one type of the emitted and received light cones in the direction of the lit plane, it becomes possible to receive the emitted light cones at several light receivers or so that light from several light emitters is received by a single light receiver. This makes it possible to emit and receive light rays which cross each other, which makes possible a precise measurement of the object in the plane between the emitting unit and the receiving unit.

An advantage of the light grid of the present invention is that the emitting and receiving units are ready to use in a variety of applications. The cross-section of the emitted light cones and the received light cones makes the system easy to adjust and align. Further, the cross-section provides an alignment tolerance which significantly enhances the adaptability and, therefore, also the utility of the light grid of the present invention.

Reducing the expansion of the emitted or received light cone in a direction transverse to the lit plane minimizes the risk that light rays are manipulated and affected by reflecting surfaces that might be present in the vicinity of the optical axis and extend parallel to the plane. This is particularly important for light grid used on machines having reflecting metallic surfaces.

The present invention further provides a second optics which generates an emitted or received light cone that has an approximately circular cross-section. This emitted or received light cone is particularly important for detecting objects or persons and protecting them against possible damage and/or injury. For securing dangerous zones, light grids should direct the light rays when possible from one light emitter directly to an oppositely positioned light receiver. Adjacent light receivers should not be influenced by light from a single light emitter. This is attained with the substantially circular cross-section of the emitted and received light cones of the second type.

Thus, the light grid of the present invention permits a precise measurement of the object with the light rays of the first type. It also permits securing a dangerous zone to protect persons with the light rays of the second type.

The first optics is preferably a cylindrical optics or lens with a cylinder axis. This is advantageous because cylindrical lenses permit a cost-effective and simple generation of emitted or received light cones having different dimensions in perpendicular directions.

The cylinder axes of the cylindrical optics are parallel and spaced apart from each other. This permits an alignment of the longer dimension of the emitted or received light cones with the oppositely located optics that are intended to be covered by the light cones.

The first optics can also be advantageously a toric optics. With such optics, it is possible to attain a more uniform distribution of the light inside the cross-section of the emitted or received light cone, which is advantageous.

The first optics and/or the second optics can also have only a single lens. This renders the optics simple and cost-effective because it uses only a single lens for each light emitter and/or light receiver. Thus, the desired shaping of the emitted or received light cone can be accomplished with only one lens. No additional optical components are required.

It is preferred to arrange the first and second optics alternatingly from each other. This is the simplest embodiment of the invention for covering the entire protected zone evenly with light rays of the first type, which have a larger dimension in the direction of the plane, and light rays of the second type, which have a circular cross-section and perform a monitoring function. In this manner, the entire protected zone serves for measuring the objects and enables a precise determination of the cross-sectional shape of the object. It further secures a dangerous zone by detecting intruding objects.

The emitted and/or received light cone of the second optics has an angle of divergence (opening angle) which preferably is between about 2° and 5°. Maintaining the opening angle between about 2° to about 5° significantly reduces the chance that rays interact with reflecting surfaces in the vicinity of the optical axes which could manipulate and/or influence the light. By limiting the divergence angle to 2° to 5°, undesirable optical influences from light reflections by metallic machine surfaces and components make the light grid of the present invention particularly well-adapted for use in industrial installations and environments.

To reduce the expansion of the emitted and/or received light cone, a slit diaphragm can be used. Such a slit diaphragm allows a simple and cost-effective expansion and shaping of the radiation or light cone profile. Differently formed emitted and/or received light cones can be formed without having to change the lens.

In another embodiment of the present invention, the light grid preferably has at least one first optics and at least one second optics which are arranged in a common optical module. This reduces the cost of the light grid. When a large number of light beams are emitted, the optical modules facilitate a simple integration of the optics. The optics are aligned in the module and have the correct spacing between the light emitters and light receivers. It is also possible to include in the optical modules a large number of optics.

The optical module preferably has connectors for securing them longitudinally to each other so that light grids of different lengths can be assembled with such modules. The optical modules preferably have a length which corresponds to different nominal lengths of the light grid. In this manner, the grids for different applications can be assembled from the same components.

A control and evaluation unit is provided for measuring the object with light beams in the lit plane. The control and evaluation unit is coupled to the light emitting unit and the light receiving unit for activating the light emitters and light receivers thereof. When a light emitter is activated, the control and evaluation unit monitors and evaluates several light receivers successively, one after the other. Conversely, by activating one light receiver, several light emitters can be successively monitored and evaluated. In this way, precise measurements, such as the width, height or diameter of an object, or the angle of an upper object edge, can be precisely determined and stored as object contour data. When such object data is compared with existing object data from previous measurements of the same object, the length of the object or its volume can be determined. In the case of repeat measurements of several objects over an extended period of time, the number of such objects can also be determined.

Measured object contour data can be stored as reference values. A comparator is coupled to the memory and the control and evaluation unit and compares measured object contour data with stored object contour data. Depending on the nature of the comparison, at least one control signal can be generated. The comparison advantageously determines if the object in question should be classified as acceptable or unacceptable. For example, objects or other products which must traverse the protected zone of the machine so that they can be further processed by or at the machine would be classified as acceptable. Conversely, persons who might suffer injuries from a potentially dangerous motion of the machine would be classified as an unacceptable intrusion, leading, for example, to a shutdown of the machine.

The present invention further provides a bridging device which is connected to the control and evaluation unit so that receivers associated with the second optics can be bypassed on the basis of the control signal from the comparator. In this manner, the second protected zone, which serves to secure a dangerous area and constitutes a safety device, can be bypassed so that an object which has been judged acceptable is permitted to pass through the protected zone.

The bridging device is activated for a limited period of time. After the object has passed the protected zone, the receivers associated with the second optics are again monitored, and in the event an unacceptable object is detected, the machine operation can be stopped for safety reasons to protect, for example, persons who may have entered the dangerous zone. For this purpose, a switching unit is provided which is connected to the comparator for arresting dangerous motions of the machine.

DESCRIPTION OF THE PREFERRED EMBODIMENTS

Figure 1:
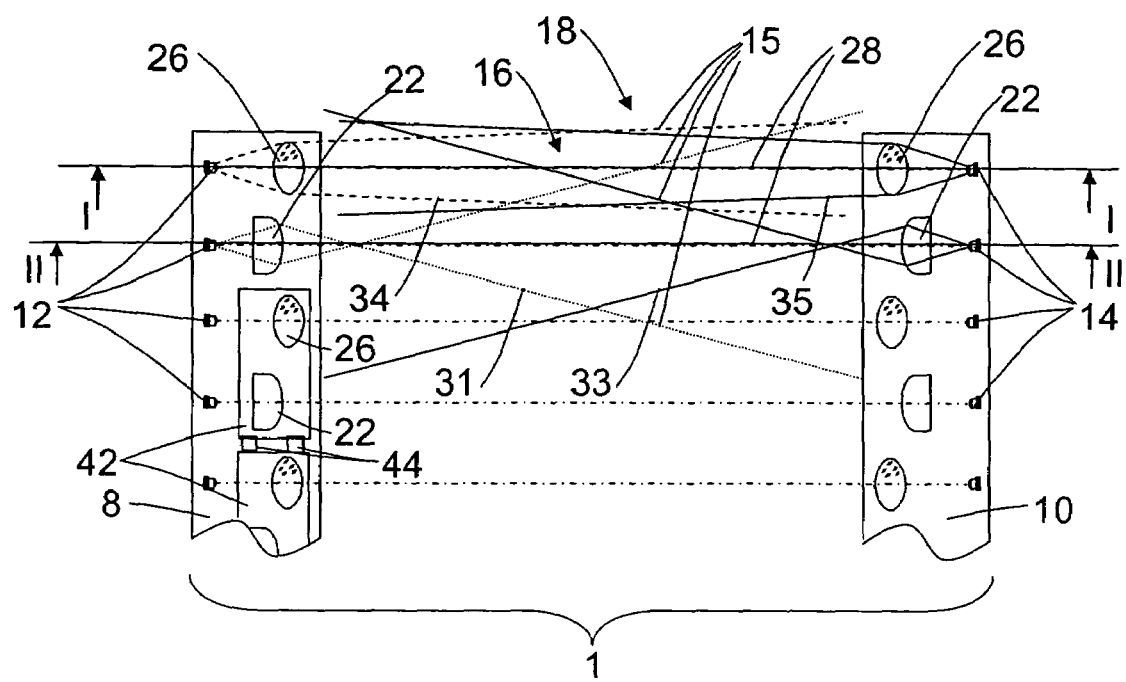
FIG. 1 schematically illustrates the light grid of the present invention.

Referring to FIG. 1, a light grid 1 constructed in accordance with the present invention includes an emitting unit 8 and a receiving unit 10. The emitting unit and the receiving unit are spaced apart and arranged opposite each other. The emitting unit 8 and receiving unit 10 each have a first optics 22 and a second optics 26 which are alternatingly arranged next to each other as illustrated in the drawing. The first optics 22 of emitting unit 8 and receiving unit 10 are preferably identically constructed. The same applies for the second optics 26, which is the reason why the first and second optics of the emitting unit and the receiving unit have the same reference numerals in the drawings. The optical axes 28 of the optics of emitting unit 8 are generally aligned with the optical axes 28 of the corresponding opposite optics of receiving unit 10.

Each optics of emitting unit 8 has an associated emitting device ("emitter") 12. Emitter 12 is arranged on optical axis 28 of the associated optics and at a distance from that optics. At the opposite side, a receiving device ("receiver") 14 is associated with each optics of receiving unit 10. The receiver 14 is also arranged along optical axis 28 and is spaced from its associated optics.

Starting with emitter 12, light beams 15 are emitted via the associated optics. The oppositely located optics direct light beams 15 to the associated receivers 14. A lit plane 14 formed by the emitted light beams between the emitting unit 8 and the receiving unit 10 defines a protected zone 18.

The first and second optics 22, 26 are differently constructed. The first optics forms first emitted and received light cones 31, 33 with light beams 15 that extend along plane 16. The emitted and received (first) light cones 31, 33 have a greater extent or dimension in the direction of plane 16 than the extent or dimension of the light cones in a direction transverse thereto. First optics 22 is preferably a cylindrical optics which has a cylinder axis. The cylindrical optics makes it possible to attain cross-sectional enlargements of the emitted and received light cones 31, 33 in a simple manner. The cylinder axes of the cylindrical optics are parallel and extend transverse to plane 16. The cylindrical optics is defined by individual cylinder lenses. This makes the cylindrical optics simple and relatively inexpensive to produce.

Second optics 22 form second emitted light cones 34 and second received light cones 35 with the light beams that extend along plane 16. The second emitted and received light cones 34, 35 have an approximately circular cross-section. The divergence angle of the second emitted and received light cones 34, 35 is preferably between about 2° to about 5° and more preferably is 2.5°. This assures that reflecting surfaces that might be present in the proximity of light grid 1 do not divert lateral portions of light beams 15 towards the receiving unit 10. Second optics 26 is preferably a single lens.

Figure 2:
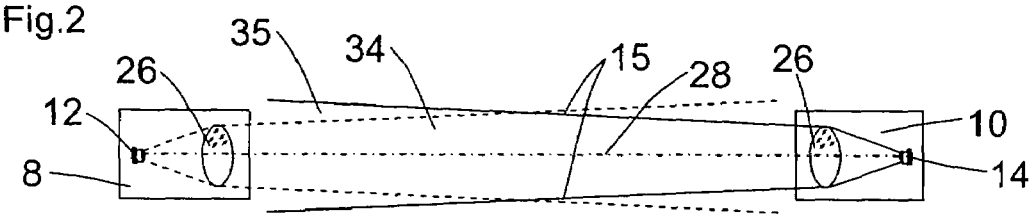
FIG. 2 is a cross-section taken along line I-I of FIG. 1.
Figure 3:
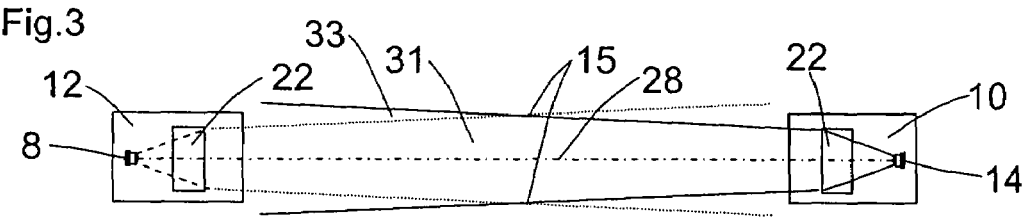
FIG. 3 is a cross-section taken along line II-II of FIG. 1.

Referring to FIGS. 2 and 3, the cross-sectional views taken along lines I-I and II-II of FIG. 1 illustrate the shape of the emitted and received light cones 31, 33, 34, 35 in a direction perpendicular to that shown in FIG. 1. The opening or divergence angles of the emitted and received light cones 31, 33, 34, 35 of the first and second optics 22, 26 in a direction transverse to protected zone 18 are the same. Light interference, for example from extraneous light, is reduced by the relatively small divergence angle of received light cone 14.

As shown in FIG. 1, the optics are spaced apart from each other. In the illustrated example, a single first optics 22 and a single second optics 26 are alternatingly arranged next to each other in emitting unit 8 and receiving unit 10, respectively. It is also feasible to select other numbers of alternating first and/or second optics 22, 26. For example, there can be two first optics 22 which alternate with two second optics 26, or only one first optics 22 can alternate with two second optics 26, or vice versa. Different arrangements and/or numbers of optics can be selected if desired.

The first and second optics are preferably arranged in optical modules 42. Each optical module 42 can have several optics. This is advantageous because the individual optics of each module are already aligned with respect to each other. The production and installation of light grids 1 having a multitude of individual light emitters 12 and light receivers 14 are thereby significantly simplified. Optics modules 42 are connected to each other with appropriate connections 44 so that individual optics modules 42 can be strung together to form an optical chain having many optical modules.

Figure 4:
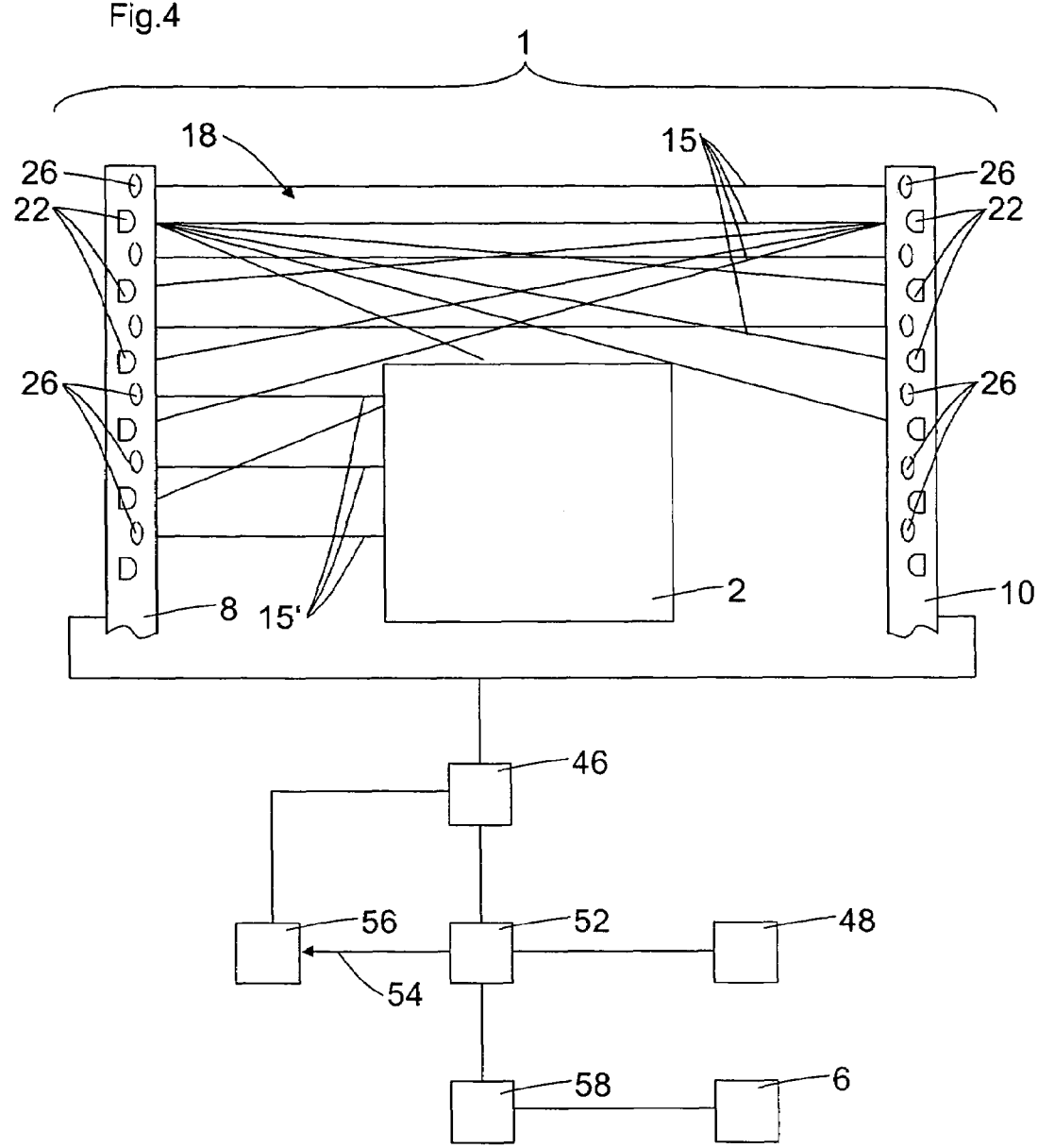
FIG. 4 is a further schematic illustration of the light grid of the present invention as used for measuring objects.

Referring to FIG. 4, which is a simplification of FIG. 1, the emitted and received light beams 15 of the first and second optics 22, 26 are used to recognize objects which interrupt the light beams. The emitted and received light beams 15 of first optics 22 can be employed to recognize object 2 as well as determine the contour or outline of the object. Light 15 emitted by one emitter 12 is directed onto several opposing optics by first optics 22. The opposing light receivers 14 are monitored, and the contour of object 2 can be accurately determined on the basis of the undisturbed light beams 15 and the interrupted light beams 15'. Conversely, the light beams 15 from several different light emitters 12 can be monitored by a single light receiver 14.

A control and evaluation unit 46 for recognizing and measuring object 2 is coupled to emitting and receiving units 8, 10. The control and evaluation unit 46 controls the individual light emitters 12 and evaluates the light receivers 14. To precisely determine the contour of an object 2, the light emitters 12 are successively activated. For each activated light emitter 12, several adjacent light receivers 14 are successively monitored for evaluating the light beams. In addition, for each evaluation of each light receiver 14, adjacent light emitters 12 are successively activated. On the basis of this evaluation, the contour of object 2 can be precisely measured and object contour related data can be generated. Cross-sections of object 2 can be more exactly measured as compared to a simple measurement which exclusively relies on parallel light beams between the emitting unit and the receiving unit 10. The monitored object contour data is then further used as needed.

A memory 48 is provided for storing the contour data of known objects as a reference. These can be fed to memory 48 via appropriate interfaces or directly with the help of a learning process. The object contour data can include a built-in tolerance for object measurements which enhances the utility of light grid 1. Stored reference object contour data is compared by a comparator 52 that is connected to memory 48 and control and evaluation unit 46. Dependent on the results of the comparison, the object contour data for object 2 is then judged acceptable or not acceptable, and a corresponding control signal 54 is generated.

Control signal 54 is used for controlling a bridging device 56 which is also connected to the control and evaluation unit 46. Based on the results from comparator 52 and the generated control signal 54, the bridging device temporarily deactivates the evaluation of receivers 14 of the second optics 26. The bridging device 56 remains active for only a limited time. In this way, the evaluation of receivers 14 of the second optics 26 is reactivated after object 2 has passed the protected zone 18. Further objects 2 which move through protected zone 18 are monitored and measured, and when an impermissible object contour is detected, a switching unit 58, which is connected to comparator 52, terminates potentially dangerous movements of machine 6.

In accordance with the above-described exemplary embodiments, the emitting and receiving units are generally alike with regard to the first and second optics. Other variations are also feasible. For example, first and second optics can be provided in the emitting unit so that only the emitted light has first and second light cone configurations. Conversely, it is also possible to provide the first and second optics only at the receiving unit so that only the received light cones have the above-discussed form. However, none of this affects the function and operation of the light grid of the present invention for surveying object contours with light cone configurations of the first type and for detecting objects with light cone configurations of the second type.

What is claimed is:

1. A light grid for measuring an object and securing a dangerous zone of a machine comprising an emitting unit having individual light emitters for directing a plurality of light beams in the form of emitted light cones approximately along a plane, a receiving unit which is spaced apart from the emitting unit and has individual light receivers for receiving light from the emitted light cones, the emitting unit and the receiving unit defining a protected zone between them, at least one of the emitting unit and the receiving unit having at least two differently formed first and second optics, the first optics generating at least one of the emitted light cone and the received light cone, the light cones having a greater dimension in a direction parallel to the plane than in a direction transverse to the plane, and the second optics generating at least one of a second emitted light cone and a second received light cone, the second light cone having an approximately circular cross-section, the first and second optics being alternatingly arranged with a spacing between them so that optical axes of the emitting unit and the receiving unit lie approximately in the plane.

2. A light grid according to claim 1 wherein the first optics comprises a cylindrical optics having a cylinder axis.

3. A light grid according to claim 2 wherein the cylinder axes of the cylindrical optics are parallel and spaced apart from each other.

4. A light grid according to claim 1 wherein the first optics comprises a toric optics.

5. A light grid according to claim 1 wherein at least one of the first optics and the second optics comprises only one lens.

6. A light grid according to claim 1 wherein the first optics and the second optics are alternatingly arranged adjacent to each other.

7. A light grid according to claim 1 wherein the second optics generates at least one of the emitted light cone and the received light cone having a divergent angle in the range between about 2° to about 5°.

8. A light grid according to claim 1 including a slit aperture for reducing a divergence of at least one of the emitted light cone and the received light cone.

9. A light grid according to claim 1 including an optical module which comprises at least one first optics and at least one second optics.

10. A light grid according to claim 9 wherein the optical module includes a connector for connecting a plurality of modules to each other in a longitudinal direction of the modules.

11. A light grid according to claim 1 including a control and evaluation unit operatively coupled to the emitting unit and the receiving unit for activating the emitters and the receivers and which, upon activation of an emitter, sequentially monitors a plurality of receivers.

12. A light grid according to claim 11 wherein the control and evaluation unit sequentially monitors a plurality of receivers upon activation of an emitter.

13. A light grid according to claim 1 including a memory for storing contour data of the object has a reference value for measuring the object.

14. A light grid according to claim 13 including a comparator operatively coupled with the memory and a control and evaluation unit for comparing measured object contour data with the stored object contour data and for generating at least one control signal in dependence on the comparison.

15. A light grid according to claim 14 including a bridging device operatively coupled with the control and evaluation unit for deactivating the receivers of the second optics on the basis of the control signal from the comparator.

16. A light grid according to claim 15 wherein the bridging device is adapted to be activated for a limited time only.

17. A light grid according to claim 16 including a switching unit operatively coupled to the comparator for inactivating a potentially dangerous movement of the machine.

* * * * *